Figure 1:
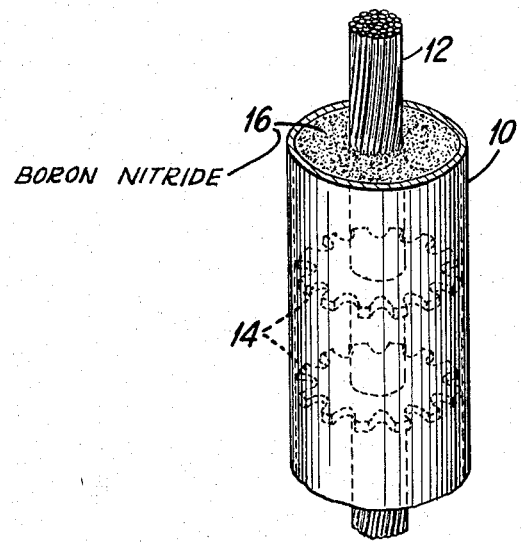

June 6, 1967 R. Q. MAINES 3,324,232
POWER TRANSMISSION CABLE
Filed Jan. 6, 1965

INVENTOR.
ROBERT Q. MAINES
BY
Hopgood & Calimafde
ATTORNEYS.

United States Patent Office 3,324,232
Patented June 6, 1967

3,324,232
POWER TRANSMISSION CABLE
Robert Q. Maines, Wilton, Conn., assignor to Ovitron Corporation, Cheshire, Conn., a corporation of Delaware
Filed Jan. 6, 1965, Ser. No. 423,807
2 Claims. (Cl. 174—118)

This invention relates generally to power transmission, and in particular, to a novel cable which may be employed for low, medium and high voltage applications.

As is well known, medium and low voltage cables are generally of the solid insulation type, wherein the current carrying conductor is covered with layers of tightly wrapped oil-impregnated paper insulation. The paper insulation is covered with non-magnetic binder tape and the entire assembly is encased in a lead sheath, and, if necessary, an armour overlay.

While this solid type of cable may be utilized for voltages up to 66 kv., voltages in excess of this value render the cable technically unsound for the following reasons. As a solid cable carries load, its conductor temperature increases, and the impregnating oil expands. This stretches the lead sheath, which may rupture or stretch permanently. Subsequently, when the load on the cable decreases and the conductor or conductors cool, a partial vacuum tends to form within the cable sheath. If pinholes are present in the lead sheath, moist air is drawn into the cable, eventually causing failure. Regardless of the presence of moisture, however, the impregnating oil, in cooling, contracts, but does not necessarily return to its original homogeneity. The resultant migration of the oil causes voids or small air spaces between and in the layers of paper insulation. The applied voltages act upon these voids to ionize the gas; the resultant discharges gradually destroying the insulation.

In order to obviate the foregoing difficulties at high voltages, the current practice envisages one of the following three alternative arrangements. (1) The use of low-viscosity mineral oil for the impregnation of the dielectric and the inclusion of channels within or adjacent the insulated cores so that when pressure is continuously applied to oil in the channels, the oil may flow between a reservoir and the paper, obviating the tendency to form voids. (2) The application of external pressure to a solid type cable, the pressure medium being separated from the oil impregnated paper dielectric by means of a flexible diaphragm, e.g., a thin lead sheath; thus, when the cable cools after a heat cycle, the external pressure prevents voids. And (3) the introduction of an inert gas at high pressure within the lead sheath and in direct contact with the dielectric, to serve the functions denoted above.

From the foregoing, it may be seen that conventional power cable is both complicated and expensive, particularly as the design voltage rating becomes greater than that at which the solid type cable may be employed.

Accordingly, it is an object of this invention to provide a power cable suitable for low, medium and high voltage applications, which is simple in construction, simple to manufacture, and is generally superior to those cable types conventionally available.

Figure 2:
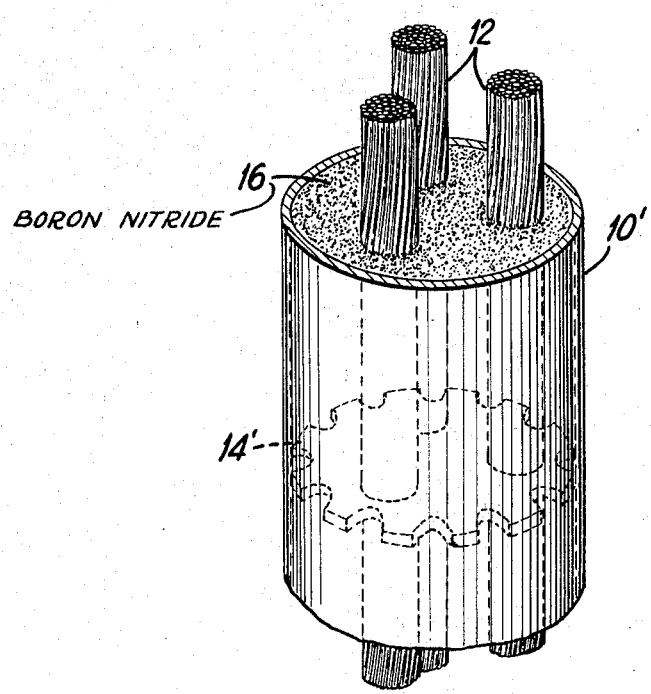

The above mentioned and other features and objects of this invention and the manner of attaining them will become more apparent and the invention itself will best be understood by reference to the following description of embodiments of the invention taken in conjunction with the accompanying drawings wherein:

FIG. 1 is a perspective cutaway view of one embodiment of a single conductor cable according to the invention; and FIG. 2 is a perspective cutaway view of one embodiment of a multiconductor cable according to the invention.

Turning now to the figures and in particular to FIG. 1, there may be seen a power cable according to the invention comprising a stranded center conductor 12 concentrically disposed within a lead sheath 10 and supported by annular disc spacers 14.

Filling the void between the conductor 12 and sheath 10 is powdered boron nitride (BN) 16 of a particle size sufficiently small to permit full potting of the interstices and good thermal conductivity (i.e. from 5 to 100 microns). The solid spacer 14, which may likewise be of boron nitride, includes peripheral serrations to allow passage of the BN particles through the spacer for ease in filling.

FIG. 2 illustrates a multiconductor cable, similarly constituted, with a solid boron nitride spacer 14' and powdered boron nitride 16 appearing between the conductor and sheath. Needless to say, the embodiment of FIG. 1 may also be used in multiconductor cables for additional protection (i.e. with each conductor individually sheathed).

The characteristics of boron nitride compare as follows to conventional transmission line oil (with oil considered as the norm—100%):

| | Percent |
|---|---|
| Thermal conductivity | 50,000 |
| Thermal expansion | 1.5 |
| Maximum operating temperature | 500 |
| Dielectric strength | 125 |

Based upon the foregoing, it may readily be seen that boron nitride in contradistinction to oil, produces no practical concern with respect to operating temperature since its expansion coefficient is relatively small, and its thermal conductivity is extremely high. Consequently, the conventional expensive precautions (delineated above) against voids are unnecessary. Further, while as a general proposition, thermal and electrical conductivity are analogous in most materials, boron nitride is an exception, and although its thermal conductivity is high, it is an excellent electrical insulator with a dielectric strength superior to that of oil. Accordingly, a smaller diameter BN cable will give the same kv. rating as a paper-oil dielectric cable, or on the other hand, the same diameter BN cable a higher kv. rating.

An additional advantage resides in the lower loss tangent of BN, and hence lower transmission losses than found with oil transmission lines. Further, BN has an omnidirectional dielectric strength, as opposed to oil impregnated paper, where metal screens must be added to each conductor, in a multiconductor cable, in order to maintain the electric field perpendicular to the paper surface (oil impregnated paper will not stand as high a voltage gradient in a direction parallel the paper as it will in a direction perpendicular to the paper).

While I have described the above principles of my invention in connection with specific configuration and materials, it is to be clearly understood that this description is made only by way of an example and not as a limitation to the scope of my invention as set forth in the objects thereof and in the accompanying claims. For example, in the foregoing it has been assumed that boron nitride has been employed alone, however, it may prove desirable to add small amounts of a high dielectric plastic vehicle to the boron nitride particles or to form a flexible polymer of boron nitride in order to lend elasticity to the material appearing between the conductor and sheath. In such a case the spacer 14 may be dispensed with.

What is claimed is:

1. Transmission cable comprising a cylindrical sheath, at least one conductor disposed within said sheath, a plurality of solid boron nitride spacers disposed at regular intervals in said cable for maintaining the relative position of said sheath and said conductor, and powdered boron nitride disposed within said sheath and substantially filling the conductor-sheath spacing.

2. Transmission cable comprising a cylindrical sheath, at least one conductor disposed within said sheath, a plurality of spacers disposed at regular intervals in said cable for maintaining the relative position of said sheath and said conductor, and powdered boron nitride of a particle size between 5 and 100 microns disposed within said sheath and substantially filling the conductor-sheath spacing.

References Cited

UNITED STATES PATENTS

| 251,552 | 12/1881 | Edison | 174—111 X |
| 2,150,780 | 3/1939 | Nickle | 174—102 |
| 3,205,296 | 9/1965 | Davis | 174—118 |

FOREIGN PATENTS 357,510  9/1931  Great Britain.

LEWIS H. MYERS, *Primary Examiner.*

E. GOLDBERG, *Assistant Examiner.*